L. T. FREEMAN, Sr.
EDUCATIONAL APPLIANCE.
APPLICATION FILED JULY 23, 1909.

971,185.

Patented Sept. 27, 1910.

2 SHEETS—SHEET 1.

Fig. 1.

L. T. FREEMAN, Sr.
EDUCATIONAL APPLIANCE.
APPLICATION FILED JULY 23, 1909.
971,185.
Patented Sept. 27, 1910.
2 SHEETS—SHEET 2.
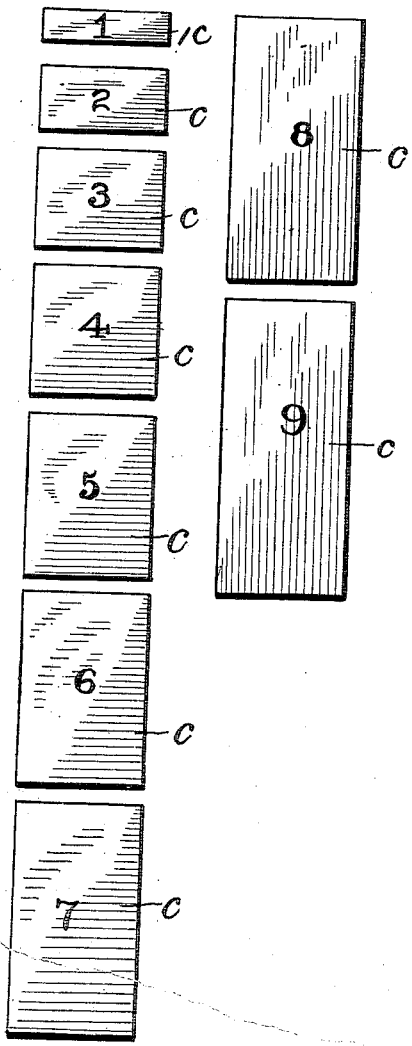
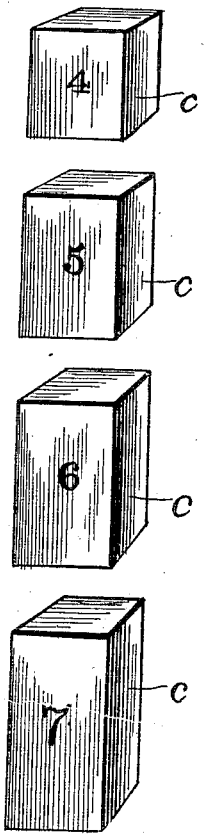
Witnesses
Mark DeGrange
Francis G. Boswell
Inventor
L. T. Freeman Sr.
By D. Swift &Co.
Attorneys

UNITED STATES PATENT OFFICE.

LABAN TAYLOR FREEMAN, SR., OF BROOKVILLE, MISSISSIPPI.

EDUCATIONAL APPLIANCE.

971,185.  Specification of Letters Patent.  Patented Sept. 27, 1910.

Application filed July 23, 1909. Serial No. 509,230.

*To all whom it may concern:*

Be it known that I, LABAN T. FREEMAN, Sr., a citizen of the United States, residing at Brookville, in the county of Noxubee and State of Mississippi, have invented a new and useful Educational Appliance; and I do hereby declare the following to be a full, clear, and exact description of the invention, such as will enable others skilled in the art to which it appertains to make and use the same.

The invention relates to an educational appliance and has for its object to provide a device of this character designed to be of service and aid to bookkeepers, accountants, bankers and the like in adding up columns of figures with a mechanical certainty.

With these and other objects in view the invention consists in the novel construction and arrangement of parts hereinafter described and shown and particularly set forth in the appended claims.

Figure 1 is a plan view of the adding board employed in this invention. Fig. 2 is a plan view of the adding blocks used in adding. Fig. 3 is a perspective view of some of the adding blocks. Fig. 4 is a detail view of the means for rendering the sum total.

Referring to the drawings $a$ designates a plurality of blank columns which are arranged along side of columns having numerals running from one upward. Each of these members for example will say, occupies one quarter of an inch space so that the top of the numeral 8 in the columns is two inches from the bottom of the numeral 1 at the bottom.

The adding blocks $c$ are made in length to vary according to their numerical value. For instance the numeral 8 is placed on a block $c$ of two inches length, while the numeral 6 is placed on a block 1 inch and a half in length, and so the longest block $c$ representing the numeral 9 is two inches and a quarter in length while the shortest block $1^c$ is one-quarter of an inch in length.

We will now proceed with an example in addition with the use of this invention. It is desired to add the numerals 5, 6, 4, 7 and 3 which we do by placing the blocks $c$ having those numerals thereon in the blank column on the right. We will see that these numerals reach up to the numeral 25 in the right hand column $b$. We then place a block with the numeral 5 at the bottom of the blank column below the line $d$ and then there is 2 to carry. The next column to be added consists of the figures 2, 8, 6, 5, and 1. When the blocks $c$ bearing these numbers respectively are placed in the middle blank column it will be seen that they reach up to the numeral 22. Then the 2 that was carried from the first column on the right is added raising the length of the blocks up to the numeral 24. The numeral 4 is then placed below the line $d$ in the middle column and the 2 is placed in the left hand column which then gives us the sum which is 245.

What is claimed is:—

1. In combination, a device having a series of divisions arranged in parallel columns, the divisions being consecutively numbered from the bottom division to the top division and being of equal area, and a series of adding blocks adapted to coöperate with the numbered divisions, said blocks being of different lengths, representing combined heights of the divisions and each being provided with a numeral corresponding to the sum of the divisions having the same length.

2. In combination, a device having a series of numbered divisions arranged in parallel rows or columns, the numbering beginning with the numeral 1, at the bottom of the columns and continuing consecutively to the top of the columns, and the divisions being of equal height, a series of blocks of varying lengths having numerals thereon adapted to coöperate with the divisions of the device, said blocks having lengths corresponding to the distance between various numbered divisions and the bottom of the divisions, whereby different sums can be added by placing the blocks above one another over the numbered divisions.

In testimony whereof I have signed my name to this specification in the presence of two subscribing witnesses.

LABAN TAYLOR FREEMAN, SR.

Witnesses:
  A. G. WILKINS,
  J. C. NANCE.